United States Patent
Cho

(10) Patent No.: US 9,088,125 B2
(45) Date of Patent: Jul. 21, 2015

(54) ELECTROMAGNETIC WAVE GENERATOR AND OPTICAL SHUTTER USING THE SAME

(75) Inventor: Sung Nae Cho, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 336 days.

(21) Appl. No.: 13/493,609

(22) Filed: Jun. 11, 2012

(65) Prior Publication Data

US 2012/0314270 A1    Dec. 13, 2012

(30) Foreign Application Priority Data

Jun. 10, 2011 (KR) .......................... 10-2011-0055914
Aug. 2, 2011 (KR) .......................... 10-2011-0076994
May 22, 2012 (KR) .......................... 10-2012-0054455

(51) Int. Cl.
  *G02B 26/02* (2006.01)
  *H01S 1/06* (2006.01)
(52) U.S. Cl.
  CPC ............... *H01S 1/06* (2013.01); *H01S 2302/02* (2013.01)
(58) Field of Classification Search
  CPC .......... H01L 21/311; H03B 7/08; H03B 1/00; G02B 26/08
  USPC ............... 359/230; 331/107 T, 94.1; 438/702
  See application file for complete search history.

(56) References Cited

U.S. PATENT DOCUMENTS

| 4,755,764 | A | 7/1988 | Rosenberg et al. |
| 5,729,017 | A | 3/1998 | Brener et al. |
| 6,870,498 | B1 | 3/2005 | Morgan et al. |
| 7,335,156 | B2 | 2/2008 | Pattern et al. |
| 7,583,172 | B2 | 9/2009 | Koonce |
| 2006/0234511 | A1 * | 10/2006 | Ohuchi .................. 438/702 |

FOREIGN PATENT DOCUMENTS

| JP | 2007278740 A | 10/2007 |
| JP | 2007317383 A | 12/2007 |
| JP | 200949159 A | 3/2009 |
| KR | 1020070070334 A | 7/2007 |

OTHER PUBLICATIONS

Cho, "A Novel Device for Generating Terahertz Radiation Pulses", Micro Devices Group, Micro Systems Laboratory, Samsung Advanced Institute of Technology, Apr. 19, 2011, 15 pages.

* cited by examiner

*Primary Examiner* — Euncha Cherry
(74) *Attorney, Agent, or Firm* — Sughrue Mion, PLLC

(57) ABSTRACT

An electromagnetic wave generator for outputting wideband electromagnetic waves, including terahertz (THz) band waves, and for controlling wavelengths of the output electromagnetic waves and an optical shutter are provided. The electromagnetic wave generator includes two electrodes that separately face each other, a chargeable particle disposed between the two electrodes, and a chamber disposed to surround the chargeable particle between the two electrodes. When DC voltages are applied to the two electrodes to generate an electric field between the two electrodes, the chargeable particle may be charged. Then, the chargeable particle reciprocates between the two electrodes to generate the electromagnetic waves. A wavelength of the output electromagnetic wave may be controlled by adjusting a potential difference between the two electrodes.

40 Claims, 14 Drawing Sheets

ELECTROMAGNETIC WAVE GENERATOR AND OPTICAL SHUTTER USING THE SAME

CROSS-REFERENCE TO RELATED APPLICATIONS

This application claims priority from Korean Patent Application No. 10-2011-0055914, filed on Jun. 10, 2011, Korean Patent Application No. 10-2011-0076994, filed on Aug. 2, 2011, and Korean Patent Application No. 10-2012-0054455, filed on May 22, 2012, in the Korean Intellectual Property Office, the disclosures of which are incorporated herein by reference in their entireties.

BACKGROUND

1. Field

The present disclosure relates to electromagnetic wave generators and optical shutters, and more particularly, to electromagnetic wave generators that may generate wideband electromagnetic waves, including waves having frequencies within the THz band, and which may control wavelengths of output electromagnetic waves, and optical shutters operating in a similar manner as the electromagnetic wave generators.

2. Description of the Related Art

Terahertz electromagnetic waves (hereinafter, referred to as terahertz waves) are electromagnetic waves generally having a frequency within the frequency band of between about 0.1 THz and about 10 THz. The terahertz waves may easily propagate through many materials through which microwaves or light waves may not propagate, and the terahertz wave may also be absorbed by moisture. Therefore, terahertz waves are increasingly being considered important for potential uses in various technical fields, such as medical, chemical, military, biological, environmental, and information communication fields. However, since apparatuses for reliably generating electromagnetic waves in the terahertz band have not been sufficiently developed, research into new terahertz generators is actively being conducted.

For example, certain types of terahertz generators, such as those using a solid state laser having non-linear crystals and terahertz generators of electromagnetic induction type using coils or magnets have been developed. However, the types of terahertz generators that have been developed thus far are limited. For example, these generators may only generate terahertz waves of a certain wavelength, or a usable band of the output terahertz waves may be too narrow to be applied to various fields. For example, terahertz waves of various wavelengths are necessary to perform tomographies of different organs (i.e., heart, blood vessels, stomach, etc.) in the human body, and the conventional terahertz generator may not satisfy this need. In addition, many of the conventional terahertz generators consume an excessive amount of power.

SUMMARY

Provided are wideband electromagnetic wave generators which capable of controlling wavelengths of output electromagnetic waves.

Provided are optical shutters that may be opened and/or closed at a high speed.

Additional aspects will be set forth in part in the description which follows and, in part, will be apparent from the description, or may be learned by practice of exemplary embodiments described herein.

According to an aspect of one or more exemplary embodiments, an electromagnetic wave generator is provided. The electromagnetic wave generator includes: a first electrode and a second electrode that faces the first electrode; at least one chargeable particle disposed between the first electrode and the second electrode; and a chamber disposed to surround the chargeable particle between the first electrode and the second electrode, wherein the chargeable particle moves between the first electrode and the second electrode to generate at least one electromagnetic wave when at least one voltage is applied to each of the first electrode and the second electrode.

The chargeable particle may be disposed in an inner space of the chamber, each of the first and second electrodes is positioned at a respective end portion of the chamber such that the inner space of the chamber is sealed, and the inner space of the chamber may be in a vacuum state or is filled with a noble gas.

The electromagnetic wave generator may further include a housing surrounding an outer portion of the chamber.

A space between the chamber and the housing may be in a vacuum state.

The chamber may be formed from an insulating material such that the first electrode and the second electrode are electrically insulated from each other, and the chamber may be configured to transmit the one or more electromagnetic waves generated by the movement of the chargeable particle.

A first direct current (DC) voltage may be applied to the first electrode, and a second DC voltage that is different from the first DC voltage may be applied to the second electrode.

Each of the first electrode and the second electrode may be flat, and a respective diameter of each of the first and second electrodes may be greater than a diameter of the chamber.

Each of the first and second electrodes may have a respective concave paraboloid surface, and the paraboloid surfaces of the first and second electrodes may be disposed to face each other.

One of the first and second electrodes may be a flat type electrode, and the other of the first and second electrodes may have a concave paraboloid surface facing the chargeable particle.

The chargeable particle may be formed of a conductive material that is electrically charged.

The chargeable particle may include a conductive core that is electrically charged and an insulating shell surrounding the conductive core.

The chargeable particle may be one of a particle that remains in a charged state independent of the application of one or more voltages to the first and second electrodes, and a particle that is charged only when at least one voltage is applied to each of the first and second electrodes and is discharged when the application of the at least one voltage is stopped.

When the at least one voltage is applied to each of the first and second electrodes, an attractive electric force which acts upon the chargeable particle may be generated between the first and second electrodes.

A strength of the electric force F generated between the first and second electrodes may be expressible as the following equation, $$F = e_z \frac{Q_T}{16} \left\{ \frac{v}{s^2} - \frac{v}{(h-s)^2} + \frac{[\gamma(b^3 - a^3) - b^3]E_p}{s^3} + \frac{[\gamma(b^3 - a^3) - b^3]E_p}{(h-s)^3} - 8E_p \right\},$$

-continued $$\gamma = \frac{3\kappa_3 b^3}{(\kappa_2 + 2\kappa_3)b^3 + 2(\kappa_2 - \kappa_3)a^3}$$

where $$v = \frac{2a(b-a)\sigma_1}{\epsilon_0 \kappa_2} + \frac{a^2 \sigma_1 + b^2 \sigma_2}{\epsilon_0 \kappa_3},$$

$Q_T$ denotes an effective charge of the chargeable particle, s denotes a distance between the first electrode and the chargeable particle, h is a distance between the first and second electrodes, a is a radius of the conductive core, b is a radius of the insulating shell, $E_P$ is a magnitude of an electric field generated between the first and second electrodes, $\sigma_1$ denotes a charge density of the conductive core, $\sigma_2$ denotes a charge density of the insulating shell, $\in_3$ is a dielectric constant of free space, $\kappa_2$ is a dielectric constant of the insulating shell, and $\kappa_3$ is a dielectric constant of a region outside of the chargeable particle and inside of the chamber.

The chamber may be a cylinder or a polygonal tube.

According to another aspect of one or more exemplary embodiments, an electromagnetic wave generator array includes a plurality of electromagnetic wave generators.

The plurality of electromagnetic wave generators may be arranged as a ring type array.

The electromagnetic wave generator array may further include an electromagnetic wave shielding film disposed in the ring type array.

Each of the plurality of electromagnetic wave generators may operate in synchronization with each other.

According to another aspect of one or more exemplary embodiments, an optical shutter includes: a first electrode and a second electrode that separately face each other; at least one chargeable particle disposed between the first electrode and the second electrode; a chamber disposed to surround the chargeable particle between the first electrode and the second electrode; and an opening formed in a center portion of the first electrode so as to transmit light, wherein the chargeable particle reciprocates between the first electrode and the second electrode to repeatedly block or transmit incident light when at least one voltage is applied to each of the first electrode and the second electrode.

The first electrode may be formed of an opaque conductive material, and the second electrode may be formed of a transparent conductive material.

A radius of the opening may be shorter than a radius of the chargeable particle.

The optical shutter may further include a transparent window arranged to in the opening.

The first electrode may have a concave surface such that the chargeable particle may be mountable on the opening.

An inner wall of the chamber may be coated with a reflective material.

The chamber may be formed of a reflective material.

The chamber may be formed of an insulating material such that the first electrode and the second electrode are electrically insulated from each other.

The opening may have a circular shape or a polygonal shape.

According to another aspect of one or more exemplary embodiments, an optical shutter array includes a plurality of the optical shutters.

The plurality of optical shutters may be arranged in a matrix array having columns and rows.

Each of the plurality of optical shutters may share a common second electrode, and each of the plurality of optical shutters may have a separate respective first electrode.

The optical shutter array may further include an opaque insulator disposed between the respective first electrodes of each of the plurality of optical shutters.

According to another aspect of one or more exemplary embodiments, an optical shutter includes: a first electrode and a second electrode that separately face each other; at least one chargeable particle disposed between the first electrode and the second electrode; and a chamber disposed to surround the chargeable particle between the first electrode and the second electrode, wherein each of the first and second electrodes comprises a transparent conductive material formed as a flat plate, an inner wall of the chamber has a reflectivity, and an intensity of propagating light is adjustable by controlling an application of a voltage to each of the first and second electrodes so as to control a frequency of an electromagnetic wave generated by a movement of the chargeable particle between the first and second electrodes arising from the application of voltage.

The chamber may be formed of a reflective metal, and the optical shutter may further include a first insulating material disposed between the chamber and the first electrode and a second insulating material disposed between the chamber and the second electrode.

The chamber may be formed of a reflective dielectric material, or a reflective coating layer may be formed on an inner wall of the chamber.

A surface of the chargeable particle may have a reflectivity.

The optical shutter may further include a transparent first substrate on which the first electrode is disposed and a transparent second substrate on which the second electrode is disposed.

The optical shutter may further include a color filter disposed on the second substrate.

The optical shutter may further include a color filter disposed on the second electrode.

The inner wall of the chamber, which has the reflectivity, may be formed as a paraboloid surface.

According to another aspect of one or more exemplary embodiments, an optical shutter includes: a first electrode and a second electrode that separately face each other; at least one chargeable particle disposed between the first electrode and the second electrode; and a chamber disposed to surround the chargeable particle between the first electrode and the second electrode, wherein the first electrode comprises an opaque conductive material formed as a flat plate and having an opening, through which light is transmittable, on a center portion, the second electrode comprises a transparent conductive material formed as a flat plate, an inner wall of the chamber has reflectivity, and an intensity of propagating light is adjustable by controlling an application of a voltage to each of the first and second electrodes so as to control a frequency of an electromagnetic wave generated by a movement of the chargeable particle between the first and second electrodes arising from the application of voltage.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
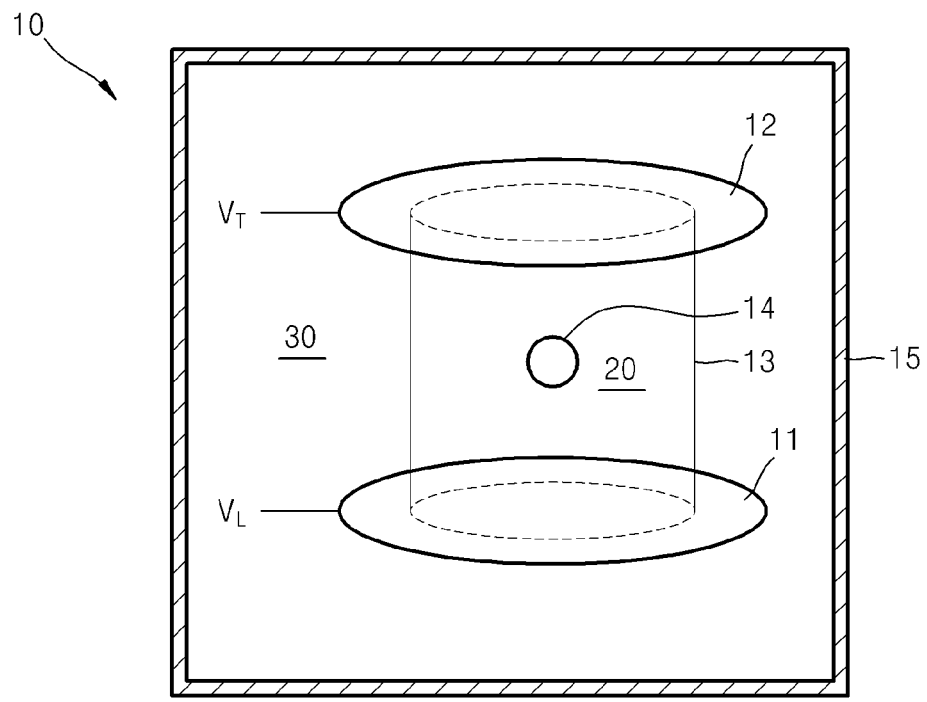
FIG. 1 is a schematic diagram of an electromagnetic wave generator according to an exemplary embodiment.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present disclosure.

Figure 2:
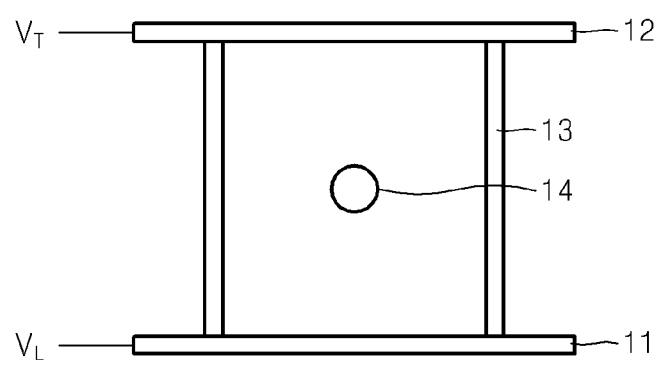
FIG. 2 is a schematic cross-sectional view of the electromagnetic wave generator of FIG. 1.

FIGS. 1 and 2 respectively are a perspective view and a cross-sectional view schematically showing a structure of an electromagnetic wave generator 10 according to an exemplary embodiment. Referring to FIGS. 1 and 2, the electromagnetic wave generator 10 includes a lower electrode 11 and an upper electrode 12 that separately face each other, a chargeable particle 14 disposed between the lower and upper electrodes 11 and 12, and a chamber 13 disposed to surround the chargeable particle 14 between the lower and upper electrodes 11 and 12. Therefore, the chargeable particle 14 may be disposed in an inner space 20 of the chamber 13, and the lower and upper electrodes 11 and 12 are disposed respectively on lower and upper portions of the chamber 13 to seal the inner space 20 of the chamber 13.

There may be no other charged particle or gas except for the chargeable particle 14 in the inner space 20 of the chamber 13. Accordingly, the inner space 20 may be maintained in a vacuum state. Otherwise, a noble gas, such as, for example, helium (He), neon (Ne), argon (Ar), krypton (Kr), or xenon (Xe), or a gas which would restrain electric discharge of the chargeable particle 14, such as, for example, sulfur hexafluoride ($SF_6$), may be used to fill in the inner space 20. In order to maintain the inner space 20 of the chamber 13 in a vacuum state or a noble gas atmosphere, the electromagnetic wave generator 10 may further include a housing 15 surrounding an outer portion of the chamber 13. A space 30 between the housing 15 and the chamber 13 may be maintained in a vacuum state.

The chamber 13 may be formed from an insulating material so that the lower and upper electrodes 11 and 12 are electrically insulated from each other. In addition, the chamber 13 may be formed from a material through which electromagnetic waves that are generated by movements of the chargeable particle 14 may propagate. Any kind of material that satisfies the above two conditions may be used to form the chamber 13. In FIG. 1, the chamber 13 is formed as a cylinder; however, exemplary embodiments are not limited thereto. For example, the chamber 13 may be formed as a polygonal tube, such as a prism or a hexahedron. In addition, FIG. 1 shows that there is one chargeable particle 14 in the chamber 13; however, exemplary embodiments are not limited thereto. For example, a plurality of chargeable particles 14 may be disposed in the chamber 13.

Figure 3:
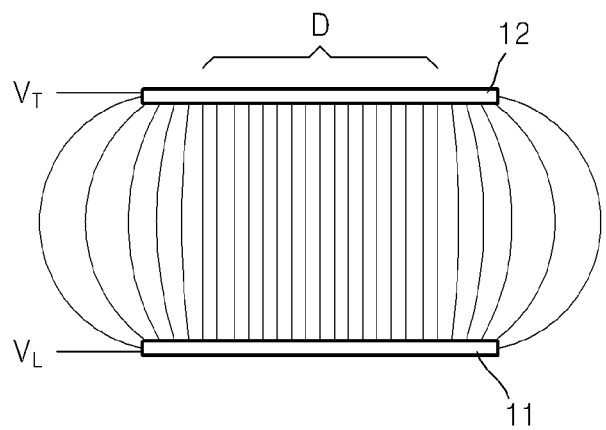
FIG. 3 is an exemplary view of an electric field generated between two electrodes of the electromagnetic wave generator shown in FIG. 1.

The lower and upper electrodes 11 and 12 are disposed to provide an electric field in the inner space 20 of the chamber 13. For example, when a voltage $V_T$ is applied to the upper electrode 12 and a voltage $V_L$ is applied to the lower electrode 11, the electric field is generated between the upper electrode 12 and the lower electrode 11. When $V_T > V_L$, the electric field is directed from the upper electrode 12 toward the lower electrode 11. When the chargeable particle 14 is charged, the chargeable particle 14 moves as a result of the electric field. In particular, in order to cause the chargeable particle 14 to move stably in an up and down direction without causing collisions between the chargeable particle 14 and the inner walls of the chamber 13, the electric field may be generated in the inner space 20 of the chamber 13 in parallel with the inner walls of the chamber 13. To do this, each respective diameter of the lower and upper electrodes 11 and 12 may be greater than a diameter of the chamber 13. As shown in FIG. 3, the electric field generated between the two parallel flat electrodes 11 and 12 is not parallel at edges of the lower and upper electrodes 11 and 12, and becomes more parallel toward center portions of the lower and upper electrodes 11 and 12. Therefore, a diameter of the chamber 13 may be selected to be equal to a diameter D of a region where the electric field is approximately parallel. In this manner, the chargeable particle 14 may be forced to remain in a center portion of the chamber 13. However, if another unit for forcing the chargeable particle 14 to remain in the center portion of the chamber 13 can be used, the respective diameters of the lower and upper electrodes 11 and 12 may be equal to the diameter of the chamber 13.

Figure 4:
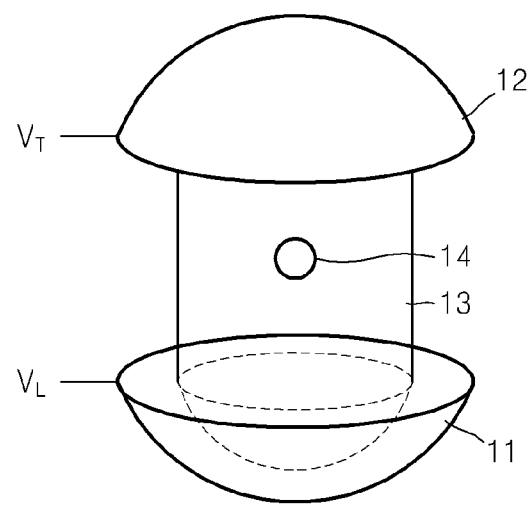
FIG. 4 is a schematic diagram of an electromagnetic wave generator according to another exemplary embodiment.
Figure 5:
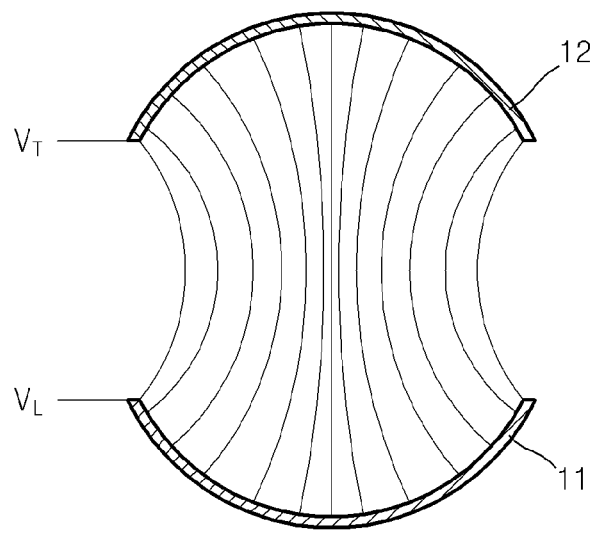
FIG. 5 is an exemplary view of an electric field generated between two electrodes of the electromagnetic wave generator shown in FIG. 4.

Although the lower and upper electrodes 11 and 12 are formed as flat panels in FIGS. 1 through 3, the lower and upper electrodes 11 and 12 may have other shapes that prevent the chargeable particle 14 from colliding with the inner wall of the chamber 13. For example, as shown in FIG. 4, an electromagnetic wave generator according to another exemplary embodiment may include each of the electrodes 11 and 12 respectively formed as having a curved shape. The two electrodes 11 and 12 are disposed so that respective concave surfaces face each other. In this case, an electric field curved inwardly toward a center portion may be formed in the chamber 13 as shown in FIG. 5. Due to the inward curvature of the electric field, the chargeable particle 14 that is disposed within the center portion of the chamber 13 is unlikely to move outward. Therefore, the chargeable particle 14 is unlikely to collide with the inner wall of the chamber 13.

Figure 6:
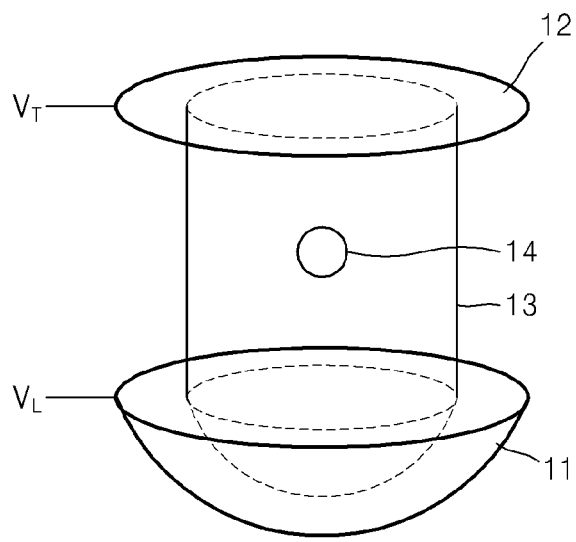
FIG. 6 is a schematic diagram of an electromagnetic wave generator according to another exemplary embodiment.

In addition, as shown in FIG. 6, one of the two electrodes 11 and 12 may be formed flat and the other may be formed in a paraboloid shape. In FIG. 6, the lower electrode 11 is formed to have a paraboloid shape and the upper electrode 12 is formed flat; however, the electrodes 11 and 12 may be arranged in an opposite way. That is, the lower electrode 11 may be formed flat and the upper electrode 12 may be formed in a paraboloid shape. Between the two electrodes 11 and 12, one having the paraboloid shape is disposed so that the concave paraboloid surface faces the chargeable particle 14.

The chargeable particle 14 may be formed from a conductive material that is electrically charged by positive or negative electric charges. For example, the chargeable particle 14 may be formed from a metal material such as, for example, aluminum (Al). The chargeable particle 14 may be always charged, or may be charged only when the voltages are applied to the lower and upper electrodes 11 and 12. The chargeable particle 14 may be formed as a single sphere. For example, chargeable metal spheres may be used as the chargeable particle 14, and moreover, ionized atoms may be used as the chargeable particle 14.

Figure 7:
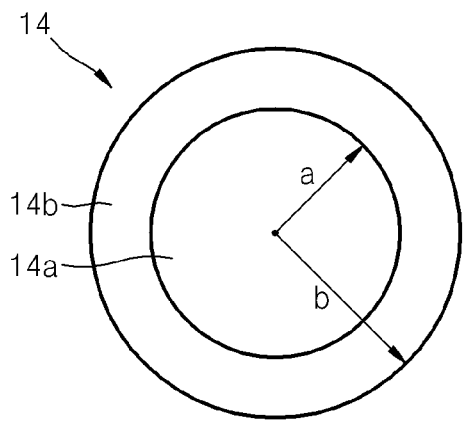
FIG. 7 is a diagram of an example of a chargeable particle disposed between two electrodes of an electromagnetic wave generator according to one or more exemplary embodiments.

Also, as shown in FIG. 7, the chargeable particle 14 may have a core-shell structure including a conductive core 14a and an insulating shell 14b. For example, the core 14a may be formed from a conductive metal that is easily charged, such as, for example, Al, and the shell 14b surrounding the core 14a may be formed of an insulating material, such as, for example, $Al_2O_3$ or $SiO_2$. If the chargeable particle 14 is formed to have the core-shell structure, when the moving chargeable particle 14 approaches to the two electrodes 11 and 12, the shell 14b, which has insulating properties, directly contacts the electrodes 11 and 12 instead of the core 14a, which has conductivity, and thus, electric leakage may be prevented. Therefore, power consumption of the electromagnetic wave generator 10 may be reduced.

Hereinafter, operations of the electromagnetic wave generator 10 according to one or more exemplary embodiments will be described in detail.

Before applying voltages to each of the two electrodes 11 and 12 of the electromagnetic wave generator 10, the chargeable particle 14 may be positioned on a surface of the lower electrode 11 due to gravity. At this point, the chargeable particle 14 may not be electrically charged. Therefore, initial voltages are applied to each of the two electrodes 11 and 12 in order to charge the chargeable particle 14 at an initial stage of operating the electromagnetic wave generator 10. For example, if the core 14a of the chargeable particle 14 is formed from Al, the voltages are applied to the electrodes 11 and 12 so that a potential difference between the electrodes 11 and 12 may be approximately equal to 700 V or greater. If the voltage $V_L$ applied to the lower electrode 11 is 0V, the voltage $V_T$ applied to the upper electrode 12 may be approximately equal to 700 V or greater. For example, the applications of these initial voltages may cause one electron to be ejected from each of the Al atoms in the core 14a, and as a result, the ejected electrons flow through the upper electrode 12. Therefore, the chargeable particle 14 is charged by positive charges. If the chargeable particle 14 is charged prior to the respective voltage applications to the electrodes 11 and 12 and the charged state may be maintained, the initializing process may not be necessary. However, if the chargeable particle 14 becomes charged only when the voltages are applied to the electrodes 11 and 12 and is discharged when the voltage application is stopped, the above initializing process may be necessary.

Once the chargeable particle 14 is in the charged state, an appropriate direct current (DC) voltage may be applied respectively to the electrodes 11 and 12 according to a desired wavelength of the output electromagnetic waves. For example, the voltages applied to the electrodes 11 and 12 may satisfy $V_T > V_L$. Then, the electric field is generated from the upper electrode 12 toward the lower electrode 11, and the chargeable particle 14 that is charged may oscillate between the lower and upper electrodes 11 and 12. The principles governing the oscillation of the chargeable particle 14 between the lower and upper electrodes 11 and 12 may be mathematically described as follows.

First, it is assumed that the two electrodes 11 and 12 are flat type electrodes that are arranged in parallel with each other, and the chargeable particle 14 has the core-shell structure illustrated in FIG. 7 and is disposed between the two electrodes 11 and 12. The core 14a of the chargeable particle 14 has a radius a and a charge density $\sigma_1$, and the shell 14b has a radius b and a charge density $\sigma_2$. In addition, the distance between the two electrodes 11 and 12 is h, and the chargeable particle 14 is located at a height s from the upper electrode 12. In addition, the voltage $V_T$ is applied to the upper electrode 12 and the voltage $V_L$ is applied to the lower electrode 11, and it is assumed that $V_T > V_L$ and $V_L > 0$ for convenience of description (however, actually, $V_L \leq 0$ may be satisfied). An electric field $E_p$ is generated between the upper electrode 12 and the lower electrode 11.

Then, an electric potential $V_1$ in a region $(r \leq a)$ in the core 14a, an electric potential $V_2$ in a region $(a < r \leq b)$ in the shell 14b, and an electric potential $V_3$ in a region $(r > b)$ outside the chargeable particle 14 may be calculated as follows by using Laplace's equation $\nabla^2 V = 0$ and a boundary condition.

$$V_1 = V_L + \alpha + E_p(h-s), \; r \leq a \qquad (1)$$

$$V_2(r, \theta) = V_L + \beta + E_p(h - s + \gamma r \cos\theta) - \frac{\lambda}{r} - \frac{a^3 \gamma E_p \cos\theta}{r^2}, \qquad (2)$$

$$a < r \leq b$$

-continued $$V_3(r, \theta) = \\ V_L + E_p(h - s + r\cos\theta) + \frac{v}{r} + \frac{[\gamma(b^3 - a^3) - b^3]E_p\cos\theta}{r^2} + C, \\ r > b \quad (3)$$

In Equations 1 through 3 above, $\alpha$, $\beta$, $\gamma$, $\lambda$, and $v$ are defined as follows.

$$\alpha = \frac{a(b-a)\sigma_1}{b\epsilon_0\kappa_2} + \frac{a^2\sigma_1 + b^2\sigma_2}{b\epsilon_0\kappa_3}, \quad (4)$$

$$\beta = \frac{a(2b-a)\sigma_1}{b\epsilon_0\kappa_2} + \frac{a^2\sigma_1 + b^2\sigma_2}{b\epsilon_0\kappa_3},$$

$$\gamma = \frac{3\kappa_3 b^3}{(\kappa_2 + 2\kappa_3)b^3 + 2(\kappa_2 - \kappa_3)a^3},$$

$$\lambda = \frac{a^2\sigma_1}{\epsilon_0\kappa_2},$$

$$v = \frac{2a(b-a)\sigma_1}{\epsilon_0\kappa_2} + \frac{a^2\sigma_1 + b^2\sigma_2}{\epsilon_0\kappa_3}$$

Equations 1 through 4 above are expressed by using spherical coordinate systems in which a center of the chargeable particle 14 is an origin. Therefore, in each of Equations 1 through 4, r denotes a radial distance from the center of the chargeable particle 14, and θ denotes an angular elevation with respect to a vertical axis (Z-axis). In Equation 3, C denotes an arbitrary constant for satisfying a boundary condition. In Equation 4, $\epsilon_0$ is a dielectric constant of free space, $\kappa_2$ is a dielectric constant of the shell 14b, and $\kappa_3$ is a dielectric constant of the inner space 20 of the chamber 13, that is, an outer region of the chargeable particle 14.

In addition, an electric displacement $D_3$ of the outer region of the chargeable particle 14 may be obtained using Equation 5 below by using the electric potential $V_3$ of the outer region of the chargeable particle 14.

$$D_3(r,\theta) = -\epsilon_0\kappa_3 \nabla V_3(r,\theta) \quad (5)$$

Based on the foregoing, the charge density $\sigma_{iup}$ on the surface of the upper electrode 12 and the charge density $\sigma_{ilp}$ on the surface of the lower electrode 11 that are induced by the electric displacement $D_3$ are obtained by applying the following Equations 6 and 7. Equations 6 and 7 are expressed in a polar coordinate system, and $\rho = \sqrt{x^2 + y^2}$.

$$\sigma_{iup}(\rho, s) = -\epsilon_0\kappa_3 \left\{ \frac{3[\gamma(b^3 - a^3) - b^3]E_p s^2}{(\rho^2 + s^2)^{5/2}} + \frac{vs - [\gamma(b^3 - a^3) - b^3]E_p}{(\rho^2 + s^2)^{3/2}} - E_p \right\} \quad (6)$$

$$\sigma_{ilp}(\rho, s) = \epsilon_0\kappa_3 \left\{ \frac{3[\gamma(b^3 - a^3) - b^3]E_p(h - s)^2}{[\rho^2 + (h - s)^2]^{5/2}} - \frac{v(h - s) + [\gamma(b^3 - a^3) - b^3]E_p}{[\rho^2 + (h - s)^2]^{3/2}} - E_p \right\} \quad (7)$$

Total charges $Q_{iT}$ induced on the surfaces of the upper and lower electrodes 11 and 12 may be expressed as $Q_{iT} = Q_{iup} + Q_{ilp}$, in which $Q_{iup}$ is the total charges induced on the upper electrode 12 and $Q_{ilp}$ is the total charges induced on the lower electrode 11. $Q_{iT}$ may be calculated as follows.

$$Q_{iT} = 4\pi\epsilon_0\kappa_3 v \quad (8)$$

The charges induced on the surfaces of the lower and upper electrodes 11 and 12 may apply force to the chargeable particle 14 by an interaction with the chargeable particle 14 that is charged. When it is assumed that the force applied to the chargeable particle 14 by the charges induced on a surface $S_1$ of the upper electrode 12 is $F_1$ and the force applied to the chargeable particle 14 by the charges induced on a surface $S_2$ of the lower electrode 11 is $F_2$, the entire force F applied to the chargeable particle 14 may be expressed by the following Equation 9.

$$F = F_1 + F_2 \\ = -\frac{1}{2}Q_T\left(\int_{S_1} dE_1 dS_1 + \int_{S_2} dE_2 dS_2\right) \quad (9)$$

In Equation 9, $E_1$ denotes the electric field at the upper electrode 12 and $E_2$ denotes the electric field at the lower electrode 11, and $Q_T$ is effective charges of the chargeable particle 14 and satisfies a relation $Q_T = -Q_{iT}$. From Equation 9 above, the following Equations 10 through 12 may be obtained.

$$F_1 = e_z \frac{Q_T}{4}\left\{ \frac{v}{4s^2} + \frac{[\gamma(b^3 - a^3) - b^3]E_p}{4s^3} - E_p \right\} \quad (10)$$

$$F_2 = e_z \frac{Q_T}{4}\left\{ \frac{[\gamma(b^3 - a^3) - b^3]E_p}{4(h - s)^3} - \frac{v}{4(h - s)^2} - E_p \right\} \quad (11)$$

$$F = e_z \frac{Q_T}{16}\left\{ \frac{v}{s^2} - \frac{v}{(h - s)^2} + \frac{[\gamma(b^3 - a^3) - b^3]E_p}{s^3} + \frac{[\gamma(b^3 - a^3) - b^3]E_p}{(h - s)^3} - 8E_p \right\} \quad (12)$$

In Equations 10 through 12 above, $e_z$ denotes a unit vector in a Z-axis direction. The result of Equation 12 above is obtained in consideration only of an electromagnetic force applied to the chargeable particle 14. When an effect of gravity acting on the chargeable particle 14 is taken into consideration, the entire force $F_T$ applied to the chargeable particle 14 may be expressed by the following Equation 13.

$$F_T = e_z \frac{Q_T}{16}\left\{ \frac{v}{s^2} - \frac{v}{(h - s)^2} + \frac{[\gamma(b^3 - a^3) - b^3]E_p}{s^3} + \frac{[\gamma(b^3 - a^3) - b^3]E_p}{(h - s)^3} - 8E_p \right\} - e_z\, mg \quad (13)$$

Referring to Equations 6, 7, and 13, density of electric charges induced onto surfaces of the upper electrode 12 and the lower electrode 11 varies depending on a location of the chargeable particle 14, and thus, an attractive force or a repulsive force may be dominantly applied to the chargeable particle 14. For example, it is assumed that a direction of the electric field Ep is formed toward the lower electrode 11 from the upper electrode 12 and the chargeable particle 14 is charged to have the positive polarity. Negative charges are distributed on an upper hemisphere of the chargeable particle 14, and positive charges are distributed on a lower hemisphere of the chargeable particle 14 due to a depolarization field, and total sum of the charges at the both hemispheres becomes positive. In addition, the negative charges are also distributed on the surface of the upper electrode 12. When the chargeable particle 14 is apart from the upper electrode 12, a density of the charges induced on the surface of the upper electrode 12 becomes lower. When the chargeable particle 14 is close to the upper electrode 12, the density of the charges induced on the surface of the upper electrode 12 becomes higher.

Figure 8A:
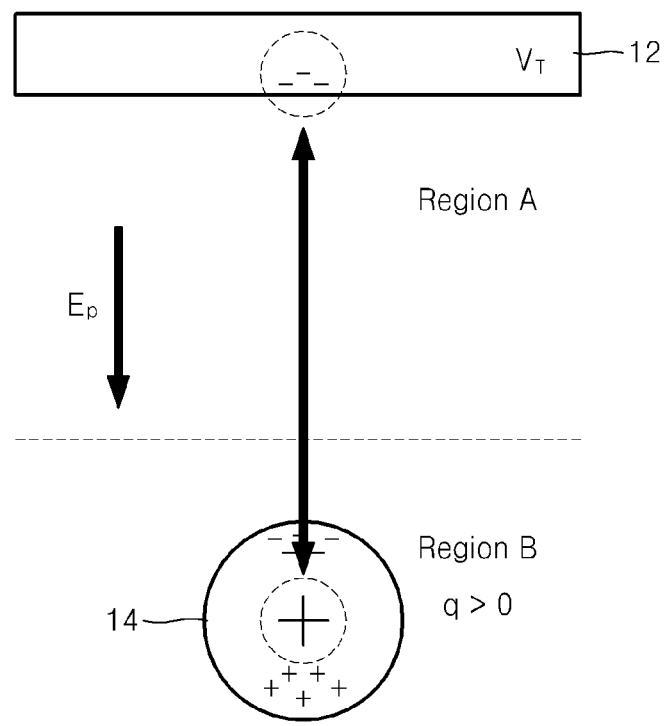
FIGS. 8A and 8B are exemplary views illustrating a principle of oscillating the chargeable particle between two electrodes in the electromagnetic wave generator according to one or more exemplary embodiments.
Figure 8B:
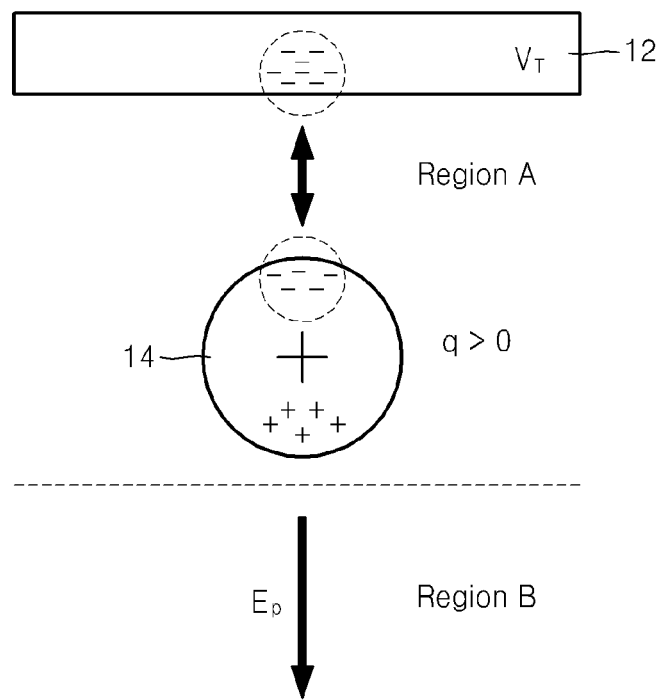
Figure 9:
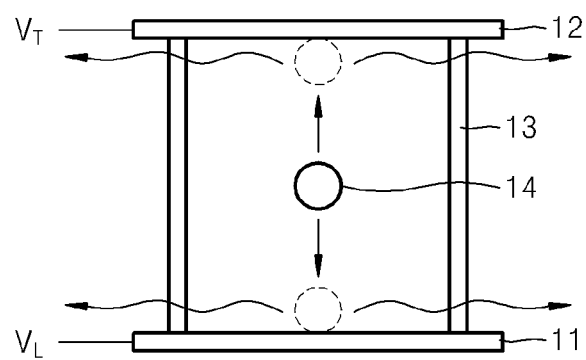
FIG. 9 is a diagram illustrating an exemplary operation of the electromagnetic wave generator according to one or more exemplary embodiments.

Therefore, when the chargeable particle 14 is apart a predetermined distance or farther from the upper electrode 12 (region A), as shown in FIG. 8A, the attractive force between the entire charges (q>0) of the chargeable particle 14 and the upper electrode 12 becomes dominant. Consequently, the chargeable particle 14 moves toward the upper electrode 12. However when the chargeable particle 14 approaches to the upper electrode within a predetermined distance or less (region B), the density of the negative charges induced on the surface of the upper electrode 12 increases, and as shown in FIG. 8B, a repulsive force becomes dominant due to the negative charges induced on the surface of the upper electrode 12 and the negative charges distributed on the upper hemisphere of the chargeable particle 14. Then, the chargeable particle 14 becomes apart from the upper electrode 12. In this principle, the chargeable particle 14 oscillates while reciprocating between the region A and the region B. When the chargeable particle 14 that is charged oscillates, electromagnetic waves are generated as shown in FIG. 9.

A computer simulation of the movement of the chargeable particle 14 was performed using the above mathematical results. In the simulation, it was assumed that the core 14a is formed of Al and the shell 14b is formed of aluminum oxide ($Al_2O_3$). In addition, a space between the lower and upper electrodes 11 and 12, that is, the inner space of the chamber 13, was maintained in a vacuum state. Also, the following design values were assumed.

Dielectric constant of the shell 14b=6
Radius a of the core 14a=25 nm
Thickness (b−a) of the shell 14b=2 nm
Distance h between the lower and upper electrodes 11 and 12=10 mm
Voltage $V_L$ applied to the lower electrode 11=0 V
Voltage $V_T$ applied to the upper electrode 12=16 kV and 32 kV
Charge density $\sigma_1$ of the core 14a=100 C/m² (C=Coulombs)
Charge density $\sigma_2$ of the shell 14b=0 nC/m²
Mass density of the core 14a=2700 kg/m³
Mass density of the shell 14b=3800 kg/m³

Figure 10:
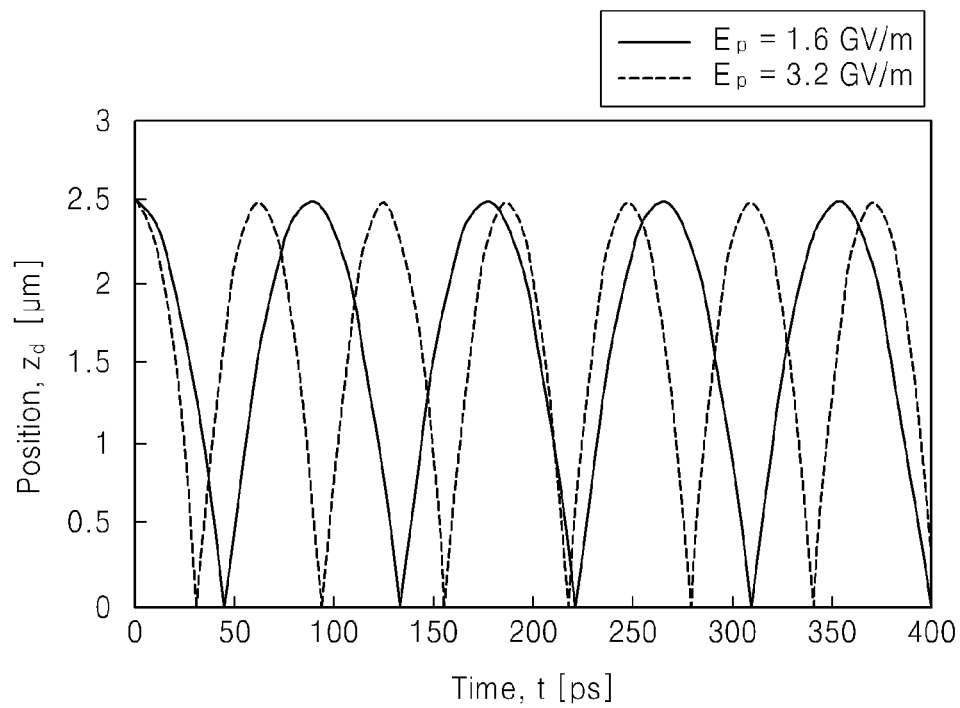
FIG. 10 is a graph showing a positional variation of a chargeable particle as a function of time resulting from a use of an electromagnetic wave generator according to one or more exemplary embodiments.
Figure 11:
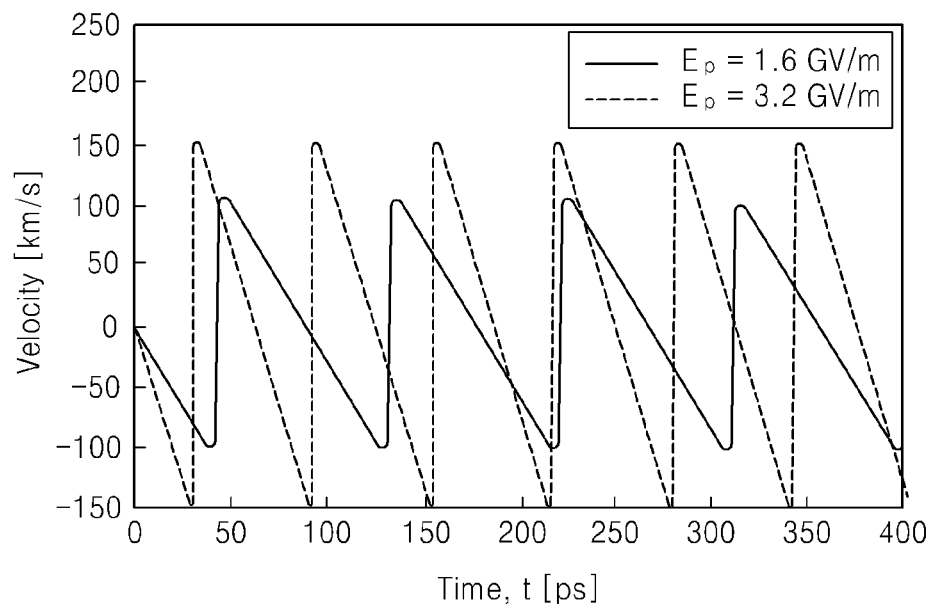
FIG. 11 is a graph showing a velocity variation of the chargeable particle as a function of time resulting from a use of an electromagnetic wave generator according to one or more exemplary embodiments.
Figure 12:
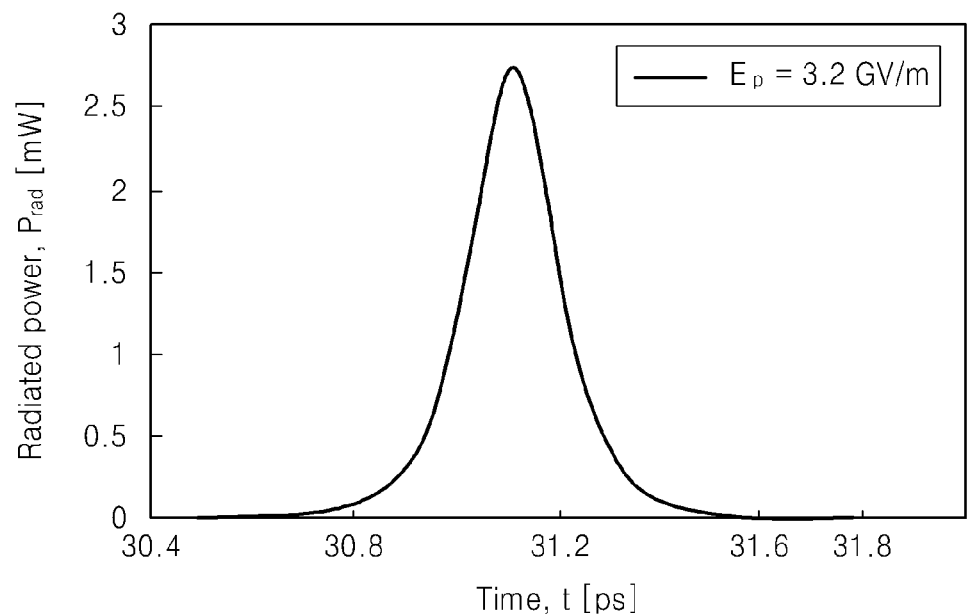
FIG. 12 is a graph showing an intensity profile of an electromagnetic wave generated by the chargeable particle resulting from a use of an electromagnetic wave generator according to one or more exemplary embodiments.

FIGS. 10 through 12 are graphs showing the results of the computer simulation. FIG. 10 is a graph showing a position variation of the chargeable particle 14 as a function of time, and FIG. 11 is a graph showing a velocity variation of the chargeable particle 14 as a function of time. As shown in the graphs of FIGS. 10 and 11, the chargeable particle 14 oscillates reciprocally between the lower and upper electrodes 11 and 12. In FIGS. 10 and 11, Ep=1.6 GV/m corresponds to $V_T$=16 kV, and Ep=3.2 GV/m corresponds to $V_T$=32 kV. As shown in FIGS. 10 and 11, when the voltage applied to the upper electrode 12 increases, the oscillating frequency of the chargeable particle 14 increases and a moving velocity also increases.

As described above, when the chargeable particle 14 that is charged oscillates reciprocally between the lower and upper electrodes 11 and 12, electromagnetic waves are generated from the chargeable particle 14. The electromagnetic waves may propagate in a direction perpendicular to the movement direction of the chargeable particle 14. Because the electromagnetic waves are generated twice while the chargeable particle 14 reciprocates between the two electrodes 11 and 12 once, the frequency of the electromagnetic waves may be equal to twice the oscillating frequency of the chargeable particle 14. FIG. 12 is a graph showing an exemplary intensity profile of the electromagnetic wave generated from the chargeable particle 14 when $V_T$=32 kV.

The oscillating frequency of the chargeable particle 14 may be adjusted by controlling the voltages applied to the electrodes 11 and 12, and thus, the electromagnetic wave generator 10 according to one or more exemplary embodiments may easily control the wavelength of the output electromagnetic waves throughout a wide frequency range, including the terahertz band. If the chargeable particle 14 is very small and light, such as, for example, one or more atoms or electrons, the chargeable particle 14 may oscillate very fast, and thus, the electromagnetic wave generator 10 may emit light, as well as the electromagnetic waves. In this case, the electromagnetic wave generator 10 may be operable to perform as a laser apparatus. For example, a plurality of chargeable and/or charged vapor atoms may be employed to fill in the chamber 13 to fabricate the laser apparatus. In the chamber 13, one chargeable particle 14 may not be disposed, but a plurality of chargeable particles 14 may be disposed. Unless there are excessive chargeable particles 14 in the chamber 13, phases of the electromagnetic waves or light emitted from each of the chargeable particles 14 may be synchronized within a predetermined range to provide the coherent electromagnetic wave or the light.

In addition, even if a high voltage is applied between the two electrodes 11 and 12, electric current flowing through the electrodes 11 and 12 is very weak, and thus, the electromagnetic wave generator 10 according to one or more exemplary embodiments has a reduced power consumption by comparison with conventional generators. In particular, when the chargeable particle 14 has the core-shell structure, the leakage of electric current may be reduced, and thus, the power consumption of the electromagnetic wave generator 10 may be further reduced.

Figure 13:
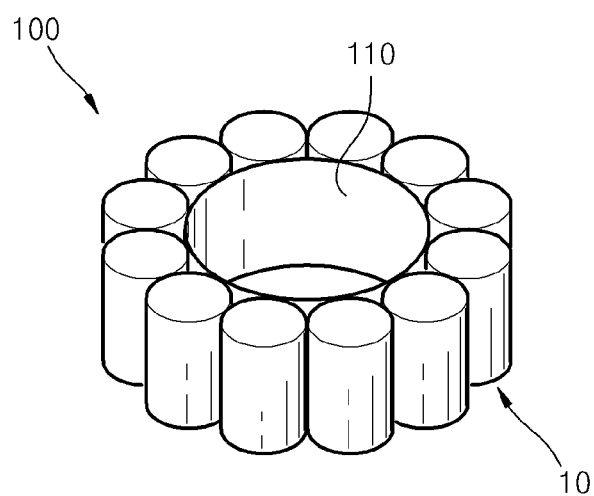
FIG. 13 is a diagram of an array which includes a plurality of electromagnetic wave generators according to an exemplary embodiment.

One electromagnetic wave generator 10 may be used; however, a plurality of electromagnetic wave generators 10 may be used together. FIG. 13 is a diagram showing an electromagnetic wave generator array 100, including a plurality of electromagnetic wave generators 10, according to an exemplary embodiment. In FIG. 13, the electromagnetic wave generator array 100 may include the plurality of electromagnetic wave generators 10 that are arranged as a ring type array, with each of the plurality of generators 10 having the same radius. However, the arrangement shown in FIG. 13 is an example, and the plurality of electromagnetic wave generators 10 may be arranged in arrays of various forms. When the plurality of electromagnetic wave generators 10 in the electromagnetic wave generator array 100 are operated in synchronization with each other, a large output of electromagnetic waves may be provided. Alternatively, the plurality of electromagnetic wave generators 10 may be operated individually in order to generate electromagnetic waves having different phases and frequencies from each other simultaneously.

In the electromagnetic wave generator array 100 shown in FIG. 13, an electromagnetic wave propagating into the ring type array of the electromagnetic wave generators 10 may interfere with an electromagnetic wave generated from another electromagnetic wave generator 10. Therefore, as shown in FIG. 13, a cylindrical electromagnetic wave shielding film 110 may be disposed in the ring type array. In this case, the electromagnetic wave propagating into the central portion of the ring type array of the electromagnetic wave generator array 100 may be blocked by the shielding film 110.

Then, the electromagnetic wave propagating toward the outer portion of the ring type array remains, and the interference occurring between the electromagnetic waves generated from the plurality of electromagnetic wave generators 10 may be prevented.

In some exemplary embodiments, as described above, DC voltages are applied to the lower and upper electrodes 11 and 12 of the electromagnetic wave generator 10. However, alternating current (AC) voltages may be applied to the lower and upper electrodes 11 and 12 such that the motion of the chargeable particle 14 may be more complex. For example, when the DC voltages are applied to the lower and upper electrodes 11 and 12, the chargeable particle 14 simply reciprocates between the upper electrode 12 and the lower electrode 11. However, when the AC voltages are applied to the lower and upper electrodes 11 and 12, the chargeable particle 14 moves complicatedly according to the voltages that are instantaneously changed. Accordingly, the intensity and frequency of the electromagnetic wave output from the electromagnetic wave generator 10 may vary complicatedly as a function of time. Therefore, an electromagnetic wave having a frequency that is instantaneously changed may be output by applying the AC voltages having predetermined frequency to the electromagnetic wave generator 10.

Figure 14A:
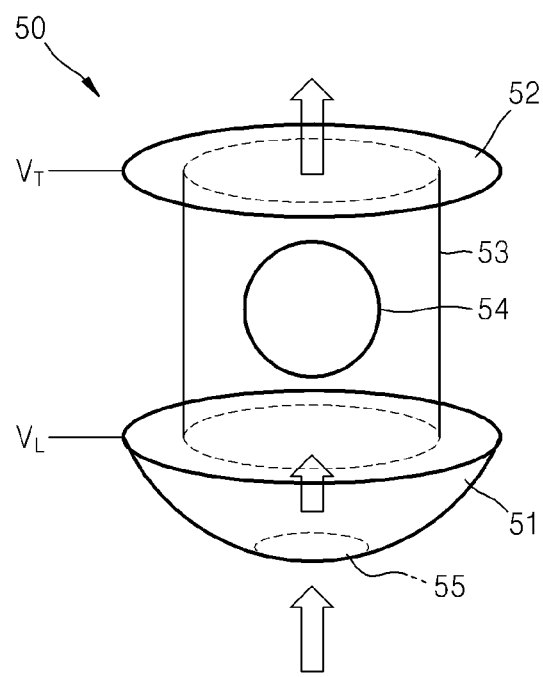
FIGS. 14A and 14B are schematic diagrams respectively showing a structure and operations of an optical shutter according to an exemplary embodiment.
Figure 14B:
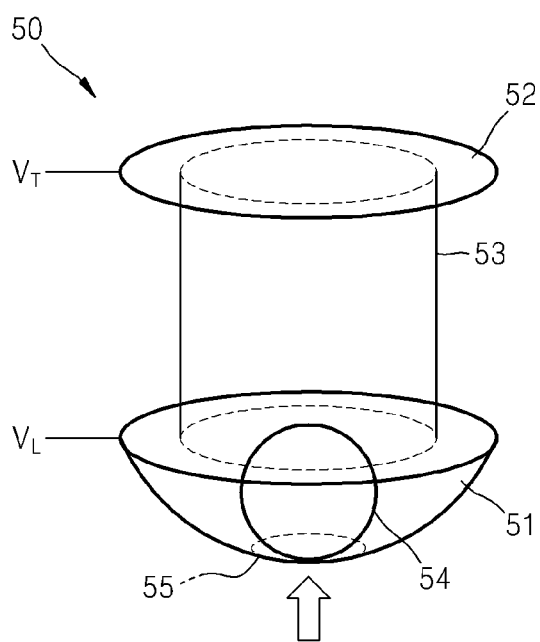

The movement of the chargeable particle 14 may be applied for manufacturing an optical shutter that may be opened and closed at a high speed, as well as to the electromagnetic wave generator 10. FIGS. 14A and 14B are schematic perspective views of an optical shutter 50 according to an exemplary embodiment. Referring to FIGS. 14A and 14B, the optical shutter 50 includes a lower electrode 51 and an upper electrode 52 that separately face each other, a chargeable particle 54 disposed between the lower and upper electrodes 51 and 52, and a chamber 53 disposed to surround the chargeable particle 54 between the lower and upper electrodes 51 and 52. The lower electrode 51, the upper electrode 52, the chamber 53, and the chargeable particle 54 may respectively be the same as or similar to the lower electrode 11, the upper electrode 12, the chamber 13, and the chargeable particle 14 of the electromagnetic wave generator 10 as described above. Hereinafter, additional features of the optical shutter 50 are provided.

The lower electrode 51 of the optical shutter 50 is formed from an opaque conductive material, and includes an opening 55 through which light may propagate in a center portion thereof. A radius of the opening 55 is shorter than a radius of the chargeable particle 54, and is sufficiently large enough to allow the light to propagate therethrough. For example, the radius of the opening 55 may be greater than a wavelength of the light. In FIGS. 17A and 17B, the opening 55 is circularly formed; however, the opening 55 may be formed to have a polygonal shape. The opening 55 may be filled with, for example, a transparent window, in order to seal an inner space of the chamber 53. The lower electrode 51 may have a concave hemispherical surface or paraboloid surface so that the chargeable particle 54 may be easily mounted on the opening 55. The upper electrode 52 may be formed from a transparent conductive material, such as, for example, indium tin oxide (ITO), aluminum zinc oxide (AZO), or indium zinc oxide (IZO). An inner wall of the chamber 53 may be coated with a material that reflects the light. Alternatively, the chamber 53 may be formed from the material that reflects the light.

In the structure described above with respect to FIGS. 14A and 14B, when voltages are applied to the lower and upper electrodes 51 and 52, the chargeable particle 54 reciprocates between the lower and upper electrodes 51 and 52. In particular, as shown in FIG. 14B, when the chargeable particle 54 blocks the opening 55 of the lower electrode 51, the light may not propagate through the optical shutter 50. Because the light is unlikely to propagate through a gap that is less than a half-wave, the chargeable particle 54 may not completely fit in the opening 55. In addition, as shown in FIG. 14A, when the chargeable particle 54 is separated from the lower electrode 51, the light propagates through the optical shutter 50. As the chargeable particle 54 approaches the upper electrode 52, the intensity of light propagating through the optical shutter 50 may increase. Even when the chargeable particle 54 is located on an optical path, the light may propagate between the inner wall of the chamber 53 and the chargeable particle 54 through diffraction. As described above, the chargeable particle 54 may reciprocate between the lower and upper electrodes 51 and 52 at a relatively high velocity, and the reciprocating speed may be controlled by the voltages applied to the lower and upper electrodes 51 and 52. Therefore, the optical shutter 50 may be opened and closed at a relatively high speed with a desired frequency by controlling the movement velocity of the chargeable particle 54. Accordingly, the optical shutter 50 may be used as a high-speed optical modulator of a three-dimensional (3D) image apparatus that must operate at a high speed.

In one or more exemplary embodiments, the intensity of the light propagating through the optical shutter 50 may be adjusted by controlling the reciprocating velocity of the chargeable particle 54. Because human vision has a limited temporal resolution, the intensity of the light sensed by human eyes may vary depending on the reciprocating velocity of the chargeable particle 54. For example, when comparing a case in which the chargeable particle 54 blocks the opening 55 once for 0.1 seconds with a case where the chargeable particle 54 blocks the opening 55 a hundred times for 0.1 seconds, the sensed intensity of the light is greater in the latter case. Color displays may be realized in the above-described way. In one exemplary embodiment, red, green, and blue lights are sequentially transmitted through the optical shutter 50, and the reciprocating velocity of the chargeable particle 54 is adjusted with respect to each color to realize desired colors. Here, sequential transmission means that the red light propagates through the optical shutter 50 for a time period of $\Delta t$, the green light propagates through the optical shutter 50 for the time period of $\Delta t$, the blue light propagates through the optical shutter 50 for the time period of $\Delta t$, and then, the transmissions of the red, green, and blue lights through the optical shutter 50 are repeatedly performed. The red, green, and blue lights may be provided by sequentially turning on and turning off each of the backlight units (not shown) corresponding to the red, green, and blue colors for the time period $\Delta t$. The intensity of the light of a certain color may be controlled by the number of blocks of the opening 55 when the light of the certain color propagates through the optical shutter 50 for the time period $\Delta t$. For example, if the opening 55 is blocked once while the backlight unit provides the green light for $\Delta t$, the intensity of the green light is relatively strong, and if the opening 55 is blocked a hundred times for $\Delta t$, the intensity of the green light is relatively weak.

Figure 15A:
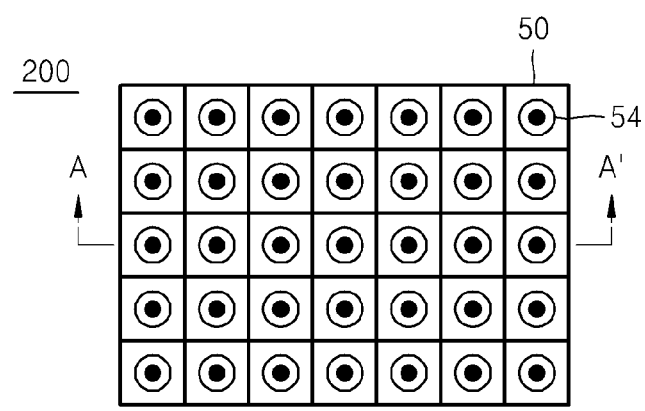
FIGS. 15A and 15B are, respectively, a schematic plan view and a schematic cross-sectional view of an optical shutter array which includes a plurality of optical shutters according to an exemplary embodiment.
Figure 15B:
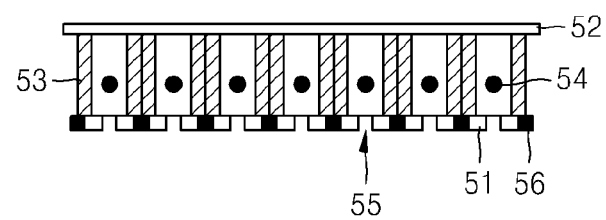

An optical shutter array may be configured by arranging a plurality of optical shutters 50. FIGS. 15A and 15B are, respectively, a schematic plan view and a schematic cross-sectional view of an optical shutter array 200, including the plurality of optical shutters 50, according to an exemplary embodiment. As shown in FIG. 15A, the optical shutter array 200 may include the plurality of optical shutters 50 that are arranged in a matrix array. One optical shutter 50 may open and close or modulate the light corresponding to a pixel.

FIG. 15B is a cross-sectional view of the optical shutter array 200 taken along line A-A' of FIG. 15A. Referring to FIG. 15B, the upper electrode 52 may be a common electrode to all of the optical, shutters 50. Conversely, the lower electrode 51 may be individually disposed in each of the optical shutters 50. In addition, an opaque insulator 56 may be further disposed between two adjacent lower electrodes 51. In this case, each of the optical shutters 50 included in the optical shutter array 200 may be individually opened and closed. However, in another exemplary embodiment, the lower electrode 51 may be a common electrode to all of the optical shutters 50. In yet another exemplary embodiment, the plurality of lower electrodes 51 shown in FIG. 15B may be connected to a common power source. In the latter two cases, all optical shutters 50 in the optical shutter array 200 may be simultaneously opened and closed.

Figure 16:
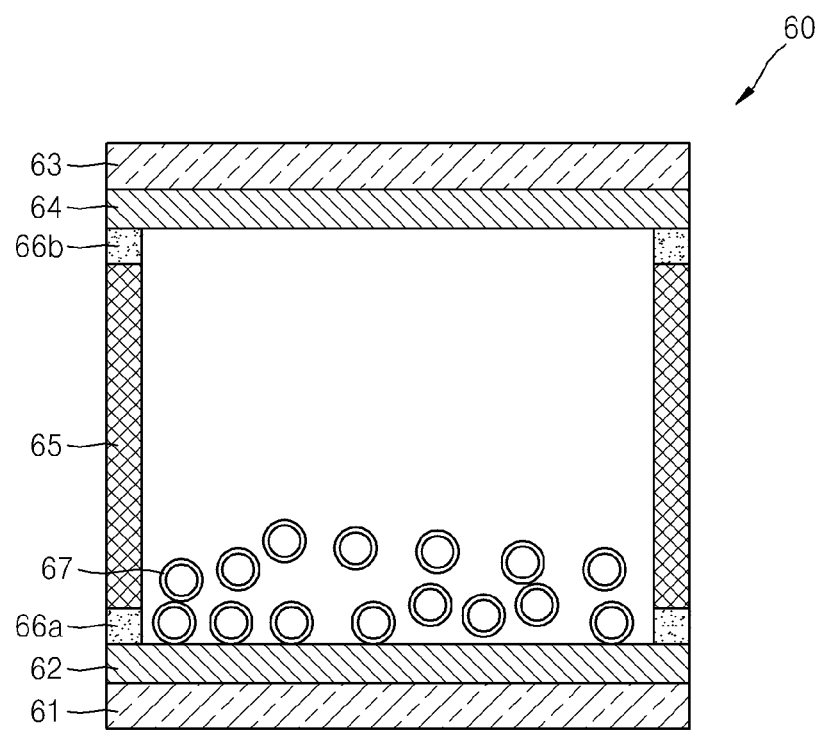
FIG. 16 is a schematic diagram showing a structure of an optical shutter according to another exemplary embodiment.

Similarly as described above with respect to an electromagnetic wave generator according to one or more exemplary embodiments, the optical shutter may also include a plurality of chargeable particles. FIG. 16 schematically shows a structure of an optical shutter 60 including a plurality of chargeable particles according to another exemplary embodiment. Referring to FIG. 16, the optical shutter 60 includes a lower electrode 62 and an upper electrode 64 facing each other, a plurality of chargeable particles 67 disposed between the lower and upper electrodes 62 and 64, and a chamber 65 disposed to surround the plurality of chargeable particles 67 between the two electrodes 62 and 64. In particular, the lower and upper electrodes 62 and 64 may be transparent electrodes formed from a transparent conductive material, such as, for example, ITO, AZO, or IZO. In addition, the lower electrode 62 may be formed as a flat plate on a transparent lower substrate 61, and the upper electrode 64 may be formed as a flat plate on a lower surface of a transparent upper substrate 63. However, the lower substrate 61 and the upper substrate 63 may be omitted.

The chamber 65 may be formed from a reflective material. For example, the chamber 65 may be formed from a reflective metal. In this case, an insulating material 66a may be disposed between the chamber 65 and the lower electrode 62 in order to insulate the lower electrode 62 from the upper electrode 64, and an insulating material 66b may be also disposed between the chamber 65 and the upper electrode 64. However, if the chamber 65 is formed from a reflective dielectric material, the insulating materials 66a and 66b may be omitted. Alternatively, a reflective coating layer may be formed on an inner wall of the chamber 65 that is formed from an insulating material.

The chargeable particle 67 may also be formed from a reflective material. For example, the chargeable particle 67 may be a metal particle having reflectivity. Alternatively, the chargeable particle 67 may be a core-shell type particle having a conductive core and an insulating shell. In this case, the insulating shell may be formed from a reflective material, or a reflective coating layer may be formed on a surface of the insulating shell. Instead, the chargeable particle 67 may absorb the light.

Figure 17:
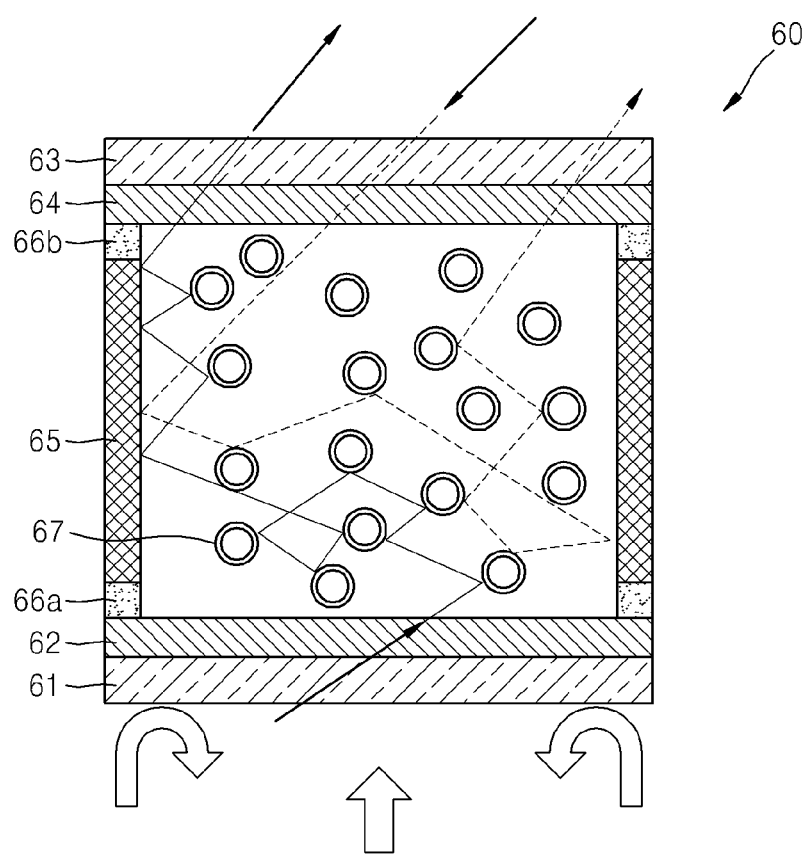
FIG. 17 is a schematic diagram illustrating operations of the optical shutter shown in FIG. 16.

In the optical shutter 60 shown in FIG. 16, when a voltage is applied to the two electrodes 62 and 64, the chargeable particles 67 oscillates while reciprocating between the two electrodes 62 and 64 as shown in FIG. 17. At this time, an intensity of the light propagating through the chamber 65 varies depending on an oscillating frequency of the chargeable particles 67, and the oscillating frequency of the chargeable particles 67 is controlled by a difference between voltages applied to the two electrodes 62 and 64. For example, the light emitted from the backlight unit is incident into the chamber 65 through the transparent lower substrate 61 and the lower electrode 62, and is subsequently reflected by the inner wall of the chamber 65 and the surfaces of the chargeable particles 67 having the reflectivity so as to be transmitted to an upper portion of the chamber 65 through the transparent upper electrode 64 and the upper substrate 63. In particular, as the oscillating frequency of the chargeable particles 67 increases, in conjunction with a corresponding increase in the potential difference between the two electrodes 62 and 64, the intensity of the light propagating through the chamber 65 may also increase.

In addition, the optical shutter 60 shown in FIG. 16 may operate as a transmission type shutter that alternately transmits and blocks the light emitted from the backlight unit; however, the optical shutter 60 may also operate as a reflective type shutter that alternately reflects and blocks external light (for example, sunlight or light from an indoor lamp). For example, as the oscillating frequency of the chargeable particles 67 increases, the light incident from the upper portion of the chamber 65 and emitted toward the upper portion of the chamber 65 by reflection from the chargeable particles 67 and the inner wall of the chamber 65 may be increased. In this case, the lower substrate 61 or the lower electrode 62 may be formed from a reflective material.

Figure 18:
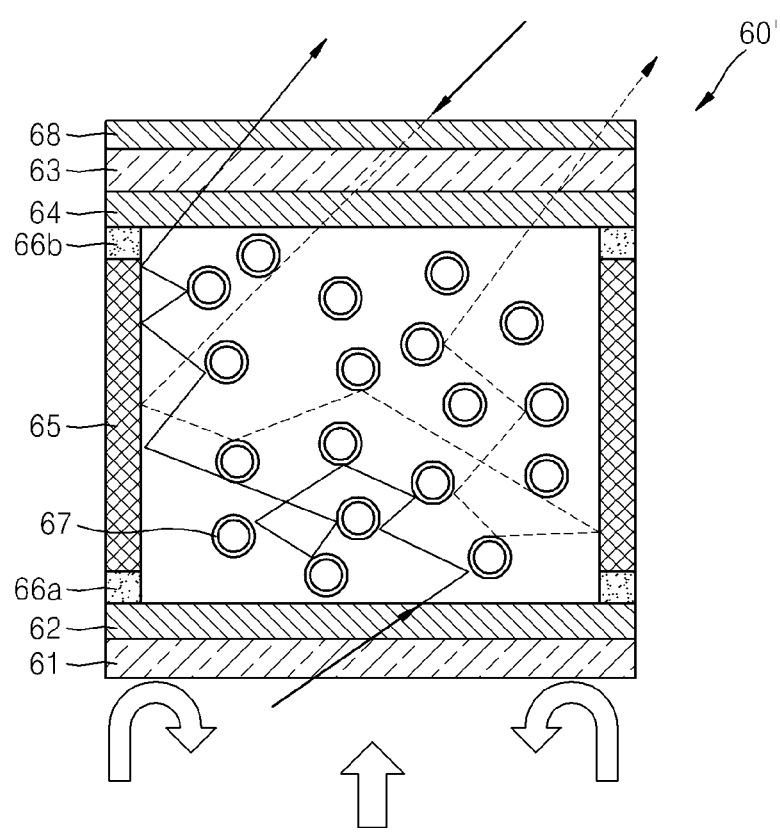
FIG. 18 is a schematic diagram showing a structure of an optical shutter according to another exemplary embodiment.

The optical shutter 60 shown in FIG. 16 may realize colors by emitting light of a certain color from the backlight unit. When a general backlight unit emitting white light is used, colors may be realized by using an optical shutter 60' having a color filter as shown in FIG. 18. Referring to FIG. 18, the optical shutter 60' may include a color filter 68 disposed on the upper substrate 63. Other elements and operations of the optical shutter 60' are similar as those of the optical shutter 60 shown in FIG. 16, as described above, except for the color filter 68. FIG. 18 shows that the color filter 68 is disposed on the upper substrate 63; however, the color filter 68 may be disposed on the upper electrode 64 without forming the upper substrate 63.

Figure 19:
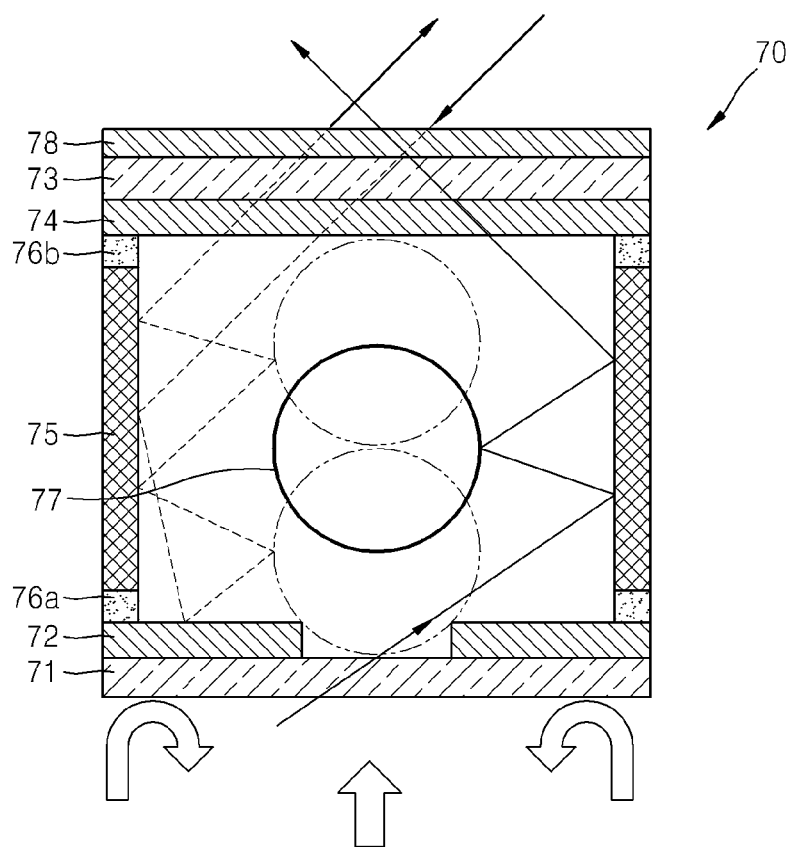
FIG. 19 is a schematic diagram showing a structure of an optical shutter according to another exemplary embodiment.

FIG. 19 schematically shows a structure of an optical shutter 70 according to another exemplary embodiment. The optical shutter 70 of FIG. 19 has a similar structure to that of the optical shutter 60 shown in FIG. 16, except that only one chargeable particle 77 is included in the optical shutter 70. In addition, the optical shutter 70 of FIG. 19 is different from the optical shutter 60 of FIG. 16 in that the lower electrode 72 is formed from an opaque conductive material having an opening in a center portion thereof so that the light may be alternately transmitted and blocked according to the position of the chargeable particle 77. In addition, respective structures and operations of a lower substrate 71, an upper substrate 73, an upper electrode 74, a chamber 75, insulating materials 76a and 76b, and a color filter 78 may be similar as those of the lower substrate 61, the upper substrate 63, the upper electrode 64, the chamber 65, the insulating materials 66a and 66b, and the color filter 68 described with reference to FIGS. 16 and 17. In the optical shutter 70 of FIG. 19, as the oscillating frequency of the chargeable particles 77 increases, the intensity of light propagating through the chamber 75 may also increase.

Figure 20:
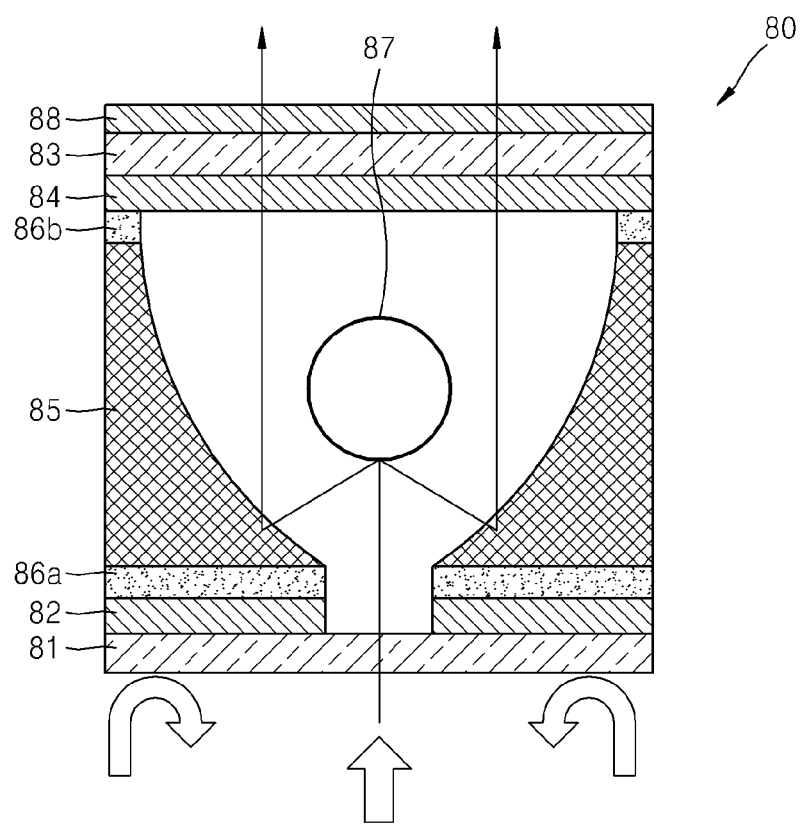
FIG. 20 is a schematic diagram showing a structure of an optical shutter according to another exemplary embodiment.

FIG. 20 schematically shows a structure of an optical shutter 80 according to another exemplary embodiment. In the optical shutters that are described above, the reflective inner wall of the chamber is formed in a vertical direction; however, an inner wall of a chamber 85 in the optical shutter 80 shown in FIG. 20 is formed as paraboloid surface. Therefore, a lower portion of the wall of the chamber 85 is thicker than an upper portion of the wall of the chamber 85, and inside of the chamber 85 has a narrow lower portion and a wide upper portion. In addition, respective structures and operations of a lower substrate 81, a lower electrode 82, an upper substrate 83, an upper electrode 84, insulating materials 86a and 86b, chargeable particles 87, and a color filter 88 may be similar as those of the lower substrate 71, the lower electrode 72, the upper substrate 73, the upper electrode 74, the insulating materials 76a and 76b, the chargeable particles 77, and the color filter 78 described with reference to FIG. 19.

In the exemplary embodiment shown in FIG. 20, the light incident to the chargeable particle 87 from a backlight unit (not shown) located beneath the optical shutter 80 is reflected by the surface of the chargeable particle 87 and incident onto the inner wall of the chamber 85. After that, the light is reflected by the inner wall of the chamber 85, which is formed as the paraboloid surface, and may be directed vertically toward an upper portion of the chamber 85. Therefore, most of the transmitted light may propagate frontward in the optical shutter 80 shown in FIG. 20, particularly by comparison with the optical shutters described above with respect to other exemplary embodiments, in which most of the light is randomly scattered. The inner wall of the paraboloid surface may be applied to the chamber 65 shown in FIGS. 16 and 18.

While exemplary embodiments have been particularly shown and described, it will be understood by those of ordinary skill in the art that various changes in form and details may be made therein without departing from the spirit and scope of the present inventive concept as defined by the appended claims. It should be understood that the exemplary embodiments described herein should be considered in a descriptive sense only and not for purposes of limitation. Descriptions of features or aspects within each embodiment should typically be considered as available for other similar features or aspects in other embodiments. Therefore, the scope of the present inventive concept is defined not by the detailed description but by the appended claims, and all differences within the scope will be construed as being included in the present disclosure.

What is claimed is:

1. An electromagnetic wave generator comprising:
    a first electrode and a second electrode that faces the first electrode;
    at least one chargeable particle disposed between the first electrode and the second electrode; and
    a chamber disposed to surround the chargeable particle between the first electrode and the second electrode,
    wherein the at least one chargeable particle moves between the first electrode and the second electrode such that a movement of the at least one chargeable particle causes a generation of at least one electromagnetic wave when at least one voltage is applied to each of the first electrode and the second electrode, and wherein the chamber is configured such that the at least one electromagnetic wave generated by the movement of the at least one chargeable particle propagates from within the chamber to an outside of the chamber.

2. The electromagnetic wave generator of claim 1, wherein the at least one chargeable particle is disposed in an inner space of the chamber, each of the first and second electrodes is positioned at a respective end portion of the chamber such that the inner space of the chamber is sealed, and the inner space of the chamber is in a vacuum state or is filled with a noble gas.

3. The electromagnetic wave generator of claim 1, further comprising a housing surrounding an outer portion of the chamber.

4. The electromagnetic wave generator of claim 3, wherein a space between the chamber and the housing is in a vacuum state.

5. The electromagnetic wave generator of claim 1, wherein the chamber is formed from an insulating material such that the first electrode is electrically insulated from the second electrode, and the chamber is configured to transmit the at least one electromagnetic wave generated by the movement of the at least one chargeable particle.

6. The electromagnetic wave generator of claim 1, wherein a first direct current (DC) voltage is applied to the first electrode, and a second DC voltage that is different from the first DC voltage is applied to the second electrode.

7. The electromagnetic wave generator of claim 1, wherein each of the first electrode and the second electrode is flat, and a respective diameter of each of the first and second electrodes is greater than a diameter of the chamber.

8. The electromagnetic wave generator of claim 1, wherein each of the first and second electrodes has a respective concave paraboloid surface, and the paraboloid surface of the first electrode is disposed to face the paraboloid surface of the second electrode.

9. The electromagnetic wave generator of claim 1, wherein one of the first and second electrodes is a flat type electrode, and another of the first and second electrodes has a concave paraboloid surface facing the at least one chargeable particle.

10. The electromagnetic wave generator of claim 1, wherein the at least one chargeable particle comprises a conductive material that is electrically charged.

11. The electromagnetic wave generator of claim 1, wherein the at least one chargeable particle comprises a conductive core that is electrically charged and an insulating shell surrounding the conductive core.

12. The electromagnetic wave generator of claim 11, wherein each of the at least one chargeable particle is one of a particle that remains in a charged state independent of the application of voltage to the first and second electrodes, and a particle that is charged only when the at least one voltage is applied to each of the first and second electrodes and is discharged when the application of the at least one voltage is stopped.

13. The electromagnetic wave generator of claim 11, wherein when the at least one voltage is applied to each of the first and second electrodes, an attractive electric force which acts upon the at least one chargeable particle is generated between the first and second electrodes.

14. The electromagnetic wave generator of claim 13, wherein a strength of the electric force F generated between the first and second electrodes is expressible as the following equation, $$F = e_z \frac{Q_T}{16} \left\{ \frac{v}{s^2} - \frac{v}{(h-s)^2} + \frac{[\gamma(b^3 - a^3) - b^3]E_p}{s^3} + \frac{[\gamma(b^3 - a^3) - b^3]E_p}{(h-s)^3} - 8E_p \right\},$$

$$\gamma = \frac{3\kappa_3 b^3}{(\kappa_2 + 2\kappa_3)b^3 + 2(\kappa_2 - \kappa_3)a^3}$$

$$\gamma = \frac{3\kappa_3 b^3}{(\kappa_2 + 2\kappa_3)b^3 + 2(\kappa_2 - \kappa_3)a^3}$$

where $$v = \frac{2a(b-a)\sigma_1}{\epsilon_0 \kappa_2} + \frac{a^2\sigma_1 + b^2\sigma_2}{\epsilon_0 \kappa_3},$$

$Q_T$ denotes an effective charge of the at least one chargeable particle, s denotes a distance between the first electrode and the at least one chargeable particle, h is a distance between the first and second electrodes, a is a radius of the conductive core, b is a radius of the insulating shell, $E_P$ is a magnitude of an electric field generated between the first and second electrodes, $\sigma_1$ denotes a charge density of the conductive core, $\sigma_2$ denotes a charge density of the insulating shell, $\epsilon_0$ is a dielectric constant of free space, $\kappa_2$ is a dielectric constant of the insulating shell, and $\kappa_3$ is a dielectric constant of a region outside of the at least one chargeable particle and inside of the chamber.

15. The electromagnetic wave generator of claim 1, wherein the chamber comprises one of a cylinder and a polygonal tube.

16. An electromagnetic wave generator array comprising a plurality of electromagnetic wave generators of claim 1.

17. The electromagnetic wave generator array of claim 16, wherein the plurality of electromagnetic wave generators is arranged as a ring type array.

18. The electromagnetic wave generator array of claim 17, further comprising an electromagnetic wave shielding film disposed in the ring type array.

19. The electromagnetic wave generator array of claim 16, wherein each of the plurality of electromagnetic wave generators operates in synchronization with each other electromagnetic wave generator of the plurality of electromagnetic wave generators.

20. An optical shutter comprising:
a first electrode and a second electrode that faces the first electrode;
at least one chargeable particle disposed between the first electrode and the second electrode;
a chamber disposed to surround the at least one chargeable particle between the first electrode and the second electrode; and
an opening formed in a center portion of the first electrode so as to transmit light,
wherein the at least one chargeable particle moves between the first electrode and the second electrode such that incident light is alternately blocked and transmitted based on a movement of the at least one chargeable particle when at least one voltage is applied to each of the first electrode and the second electrode.

21. The optical shutter of claim 20, wherein the first electrode comprises an opaque conductive material, and the second electrode comprises a transparent conductive material.

22. The optical shutter of claim 20, wherein a radius of the opening is shorter than a radius of the at least one chargeable particle.

23. The optical shutter of claim 20, further comprising a transparent window arranged to fill in the opening.

24. The optical shutter of claim 20, wherein the first electrode has a concave surface such that the at least one chargeable particle is mountable on the opening.

25. The optical shutter of claim 20, wherein an inner wall of the chamber is coated with a reflective material.

26. The optical shutter of claim 20, wherein the chamber comprises a reflective material.

27. The optical shutter of claim 20, wherein the chamber comprises an insulating material such that the first electrode is electrically insulated from the second electrode.

28. The optical shutter of claim 20, wherein the opening has one of a circular shape and a polygonal shape.

29. An optical shutter array comprising a plurality of optical shutters of claim 20.

30. The optical shutter array of claim 29, wherein the plurality of optical shutters is arranged in a matrix array having columns and rows.

31. The optical shutter array of claim 29, wherein each optical shutter of the plurality of optical shutters shares a common second electrode, and each of the plurality of optical shutters has a separate respective first electrode.

32. The optical shutter array of claim 31, further comprising an opaque insulator disposed between the respective first electrodes of each of the plurality of optical shutters.

33. An optical shutter comprising:
a first electrode and a second electrode that faces the first electrode;
at least one chargeable particle disposed between the first electrode and the second electrode; and
a chamber disposed to surround the at least one chargeable particle between the first electrode and the second electrode,
wherein each of the first and second electrodes comprises a transparent conductive material formed as a flat plate, an inner wall of the chamber has a reflectivity, and an intensity of propagating light is adjustable by controlling an application of a voltage to each of the first and second electrodes so as to control a frequency of an electromagnetic wave generated by a movement of the at least one chargeable particle between the first and second electrodes arising from the application of voltage.

34. The optical shutter of claim 33, wherein the chamber comprises a reflective metal, and the optical shutter further comprises a first insulating material disposed between the chamber and the first electrode and a second insulating material disposed between the chamber and the second electrode.

35. The optical shutter of claim 33, wherein the chamber comprises one of a reflective dielectric material and a reflective coating layer formed on an inner wall of the chamber.

36. The optical shutter of claim 33, wherein a surface of the at least one chargeable particle has a reflectivity.

37. The optical shutter of claim 33, further comprising a transparent first substrate on which the first electrode is disposed and a transparent second substrate on which the second electrode is disposed.

38. The optical shutter of claim 37, further comprising a color filter disposed on the second substrate.

39. The optical shutter of claim 33, further comprising a color filter disposed on the second electrode.

40. The optical shutter of claim 33, wherein the inner wall of the chamber is formed as a paraboloid surface.

* * * * *